US008416315B2

United States Patent
Naka

(10) Patent No.: US 8,416,315 B2
(45) Date of Patent: Apr. 9, 2013

(54) IMAGING APPARATUS AND IMAGING APPARATUS CONTROL METHOD

(75) Inventor: Yasutaka Naka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 12/884,015

(22) Filed: Sep. 16, 2010

(65) Prior Publication Data

US 2011/0069193 A1    Mar. 24, 2011

(30) Foreign Application Priority Data

Sep. 24, 2009 (JP) ................................. 2009-219195
Aug. 27, 2010 (JP) ................................. 2010-191295

(51) Int. Cl.
*H04N 5/228* (2006.01)

(52) U.S. Cl.
USPC .......................... 348/222.1; 382/118; 396/264

(58) Field of Classification Search .......... 348/222.1, 348/77, 207.99, 362, 143, 152, 156, 208.99; 382/181, 118; 396/264
See application file for complete search history.

(56) References Cited

U.S. PATENT DOCUMENTS

| 8,004,573 B2* | 8/2011 | Watanabe | 348/211.99 |
| 8,094,216 B2* | 1/2012 | Shintani | 348/251 |
| 8,116,539 B2* | 2/2012 | Nishijima | 382/118 |
| 2005/0190264 A1* | 9/2005 | Neal | 348/207.1 |
| 2007/0274703 A1* | 11/2007 | Matsuda | 396/264 |
| 2008/0068466 A1* | 3/2008 | Tamaru et al. | 348/208.99 |
| 2009/0087039 A1* | 4/2009 | Matsuura | 382/118 |
| 2010/0026830 A1* | 2/2010 | Kim | 348/222.1 |

FOREIGN PATENT DOCUMENTS

| CN | 101399916 A | 4/2009 |
| JP | 2006-254358 A | 9/2006 |

* cited by examiner

*Primary Examiner* — Chieh M Fan
*Assistant Examiner* — Wesley J Chiu
(74) *Attorney, Agent, or Firm* — Canon U.S.A., Inc. IP Division

(57) ABSTRACT

In image shooting using a self timer on an apparatus, the apparatus allows a user to control continuous shooting of a plurality of frames of images according to the user's desire. In image shooting using a self timer on the apparatus, the apparatus changes a timing of starting image shooting by self timer for a second image and beyond to be continuously shot according to detected faces of persons. The apparatus notifies the user that the timing for starting the image shooting by self timer is currently calculated. With this configuration, the user can control the timing of shooting images by continuous shooting. Accordingly, the user convenience in using the apparatus in shooting a plurality of frames of images of variable attitudes and objects is improved.

12 Claims, 7 Drawing Sheets

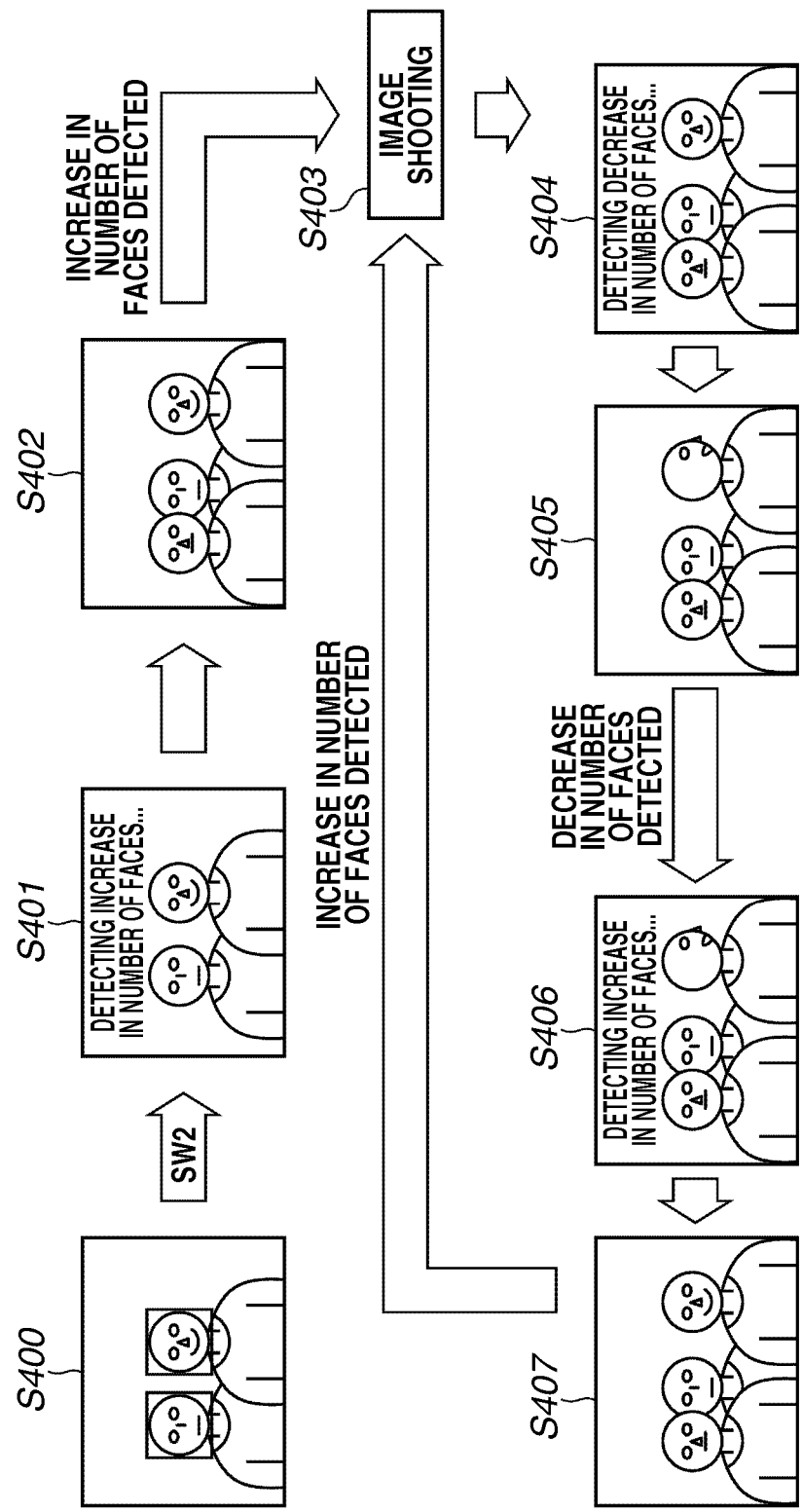

IMAGING APPARATUS AND IMAGING APPARATUS CONTROL METHOD

BACKGROUND OF THE INVENTION

1. Field of the Invention

The present invention relates to an imaging apparatus and an imaging apparatus control method. In particular, the present invention relates to a technique for controlling a timing of shooting according to a result of a face detection.

2. Description of the Related Art

Conventionally, a method for controlling a shutter timing according to a user's desire is discussed in order to implement a self timer shooting more useful than a self timer function that uses a fixed timer value used in self timer shooting. More specifically, a conventional imaging apparatus is capable of starting self timer shooting when a person's face is detected. Japanese Patent Application Laid-Open No. 2006-254358 discusses a method for detecting a person's face from data of a captured image and for starting self timer shooting if it is determined that the detected face is not swaying. Thus, the method is capable of controlling a shutter timing according to a user's desire.

Suppose that an imaging apparatus like this, which is capable of controlling the shutter timing, is used and that a user desires to shoot images of a plurality of frames by self timer shooting. In this case, the user is to come back to where the camera is placed in order to execute the above described self timer shooting every time an image is shot. Accordingly, if the imaging apparatus discussed in Japanese Patent Application Laid-Open No. 2006-254358 is used, a user is to perform troublesome camera operations.

In addition, suppose that a plurality of images of a previously set number is continuously shot after a person is detected. In this case, if the user desires to shoot a plurality of frames of images of different poses or persons, there is no timing to change the poses or persons. Accordingly, the above-described conventional method may not be useful in securing user convenience.

SUMMARY OF THE INVENTION

According to an aspect of the present invention, an apparatus includes an imaging unit configured to capture an image, an operation member configured to receive an operation, a detection unit configured to detect faces of a plurality of persons from image data of the captured image, and a control unit configured to set a number of detected faces when a user operates the operation member as a reference number of faces and control the imaging unit to start a shooting operation if the number of detected faces is greater than the reference number after the operation member is operated, wherein the control unit is configured to allow the imaging unit to resume the shooting operation if the predetermined time period elapses after the shooting operation is completed and if the number of detected faces has become greater than the reference number.

According to another aspect of the present invention, an apparatus includes an imaging unit configured to capture an image, an operation member configured to receive an operation, a detection unit configured to detect faces of a plurality of persons from image data of the captured image, and a control unit configured to set a number of detected faces when a user operates the operation member as a reference number of faces and control the imaging unit to start a shooting operation if the number of detected faces is greater than the reference number after the operation member is operated, wherein the control unit is configured to allow the imaging unit to resume the shooting operation, after the shooting operation is completed and it is detected that the number of detected faces has become smaller than the number of faces detected at the timing of starting the shooting operation, if it is detected that the number of detected faces has become greater than the reference number.

According to yet another aspect of the present invention, an apparatus includes an imaging unit configured to capture an image, an operation member configured to receive an operation, a detection unit configured to detect faces of a plurality of persons from image data of the captured image, and a control unit configured to set a number of detected faces when a user operates the operation member as a reference number of faces and control the imaging unit to start a shooting operation if the number of detected faces is greater than the reference number after the operation member is operated, wherein the control unit is configured to allow the imaging unit to resume the shooting operation, after the shooting operation is completed and it is detected that the number of detected faces has not varied for the predetermined time period, if it is detected that the number of detected faces has become greater than the reference number.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 7 illustrates an example of an image shooting situation according to the second exemplary embodiment of the present invention.

DESCRIPTION OF THE EMBODIMENTS

Various exemplary embodiments, features, and aspects of the invention will be described in detail below with reference to the drawings.

Figure 1:
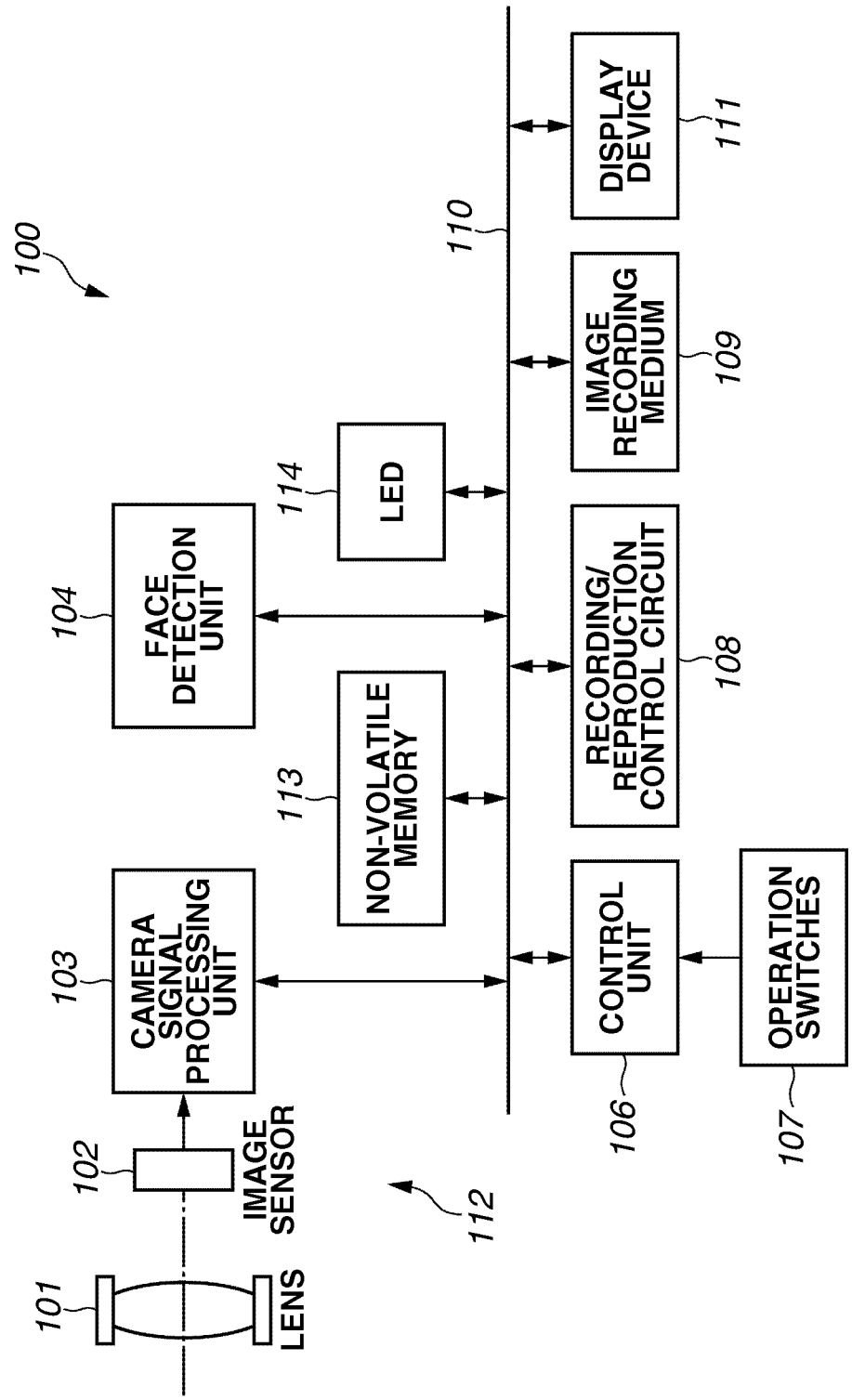
FIG. 1 is a block diagram illustrating an exemplary outline configuration of an imaging apparatus according to an exemplary embodiment of the present invention.

FIG. 1 is a block diagram illustrating an exemplary functional configuration of an imaging apparatus 100 according to an exemplary embodiment of the present invention. Referring to FIG. 1, the imaging apparatus 100 according to the present exemplary embodiment includes a lens unit 101, an image sensor 102, a camera signal processing unit 103, a face detection unit 104, operation switches 107, a recording and reproduction control circuit 108, an image recording medium 109, a display device 111, a light-emitting diode (LED) (a light emission member) 114, and a control unit 106. The image sensor 102 may include a charge-coupled device (CCD) sensor, and a complementary metal oxide semiconductor (CMOS) sensor. Above described units are in communication with one another via a bus 110. The lens unit 101, the image sensor 102, and the camera signal processing unit 103 constitute an imaging unit 112.

The control unit 106 records an image captured by the imaging unit 112 on the image recording medium 109 as digital data. More specifically, the imaging apparatus 100 according to the present exemplary embodiment is a digital camera. In the present exemplary embodiment, a digital camera includes a digital video camera having a still image shooting function, a mobile phone, a personal digital assistant (PDA), and a camera attached to (built-in in) a personal computer (PC) as well as including a digital still camera.

The imaging apparatus 100 according to the present exemplary embodiment includes a plurality of shooting modes, such as a normal shooting mode, a continuous shooting mode, and a timer shooting mode. These shooting modes are stored on a nonvolatile memory 113. In the normal shooting mode, recording of a captured image (final shooting) is executed immediately when an image shooting button included in the operation switches 107 is pressed by a user. In the continuous shooting mode, image shooting and recording is repeatedly executed while the user keeps pressing the image shooting button. In the timer shooting mode, when the user presses the image shooting button, images are finally shot and recorded at an image shooting timing that satisfy a predetermined condition.

Now, each functional unit will be described in detail below. In the example illustrated in FIG. 1, the imaging unit 112 includes the lens unit 101, the image sensor 102, and the camera signal processing unit 103. In addition, the imaging unit 112 includes mechanisms and motors, which are not illustrated. Further, the imaging unit 112 includes an auto focus (AF) function. The lens unit 101 includes a zoom lens, which implements a zoom function and a focusing lens for focusing on an arbitrary object. The motors (not illustrated) include a zoom lens motor, a focus motor, and a shutter motor. In the imaging apparatus 100, which includes the above-described configuration, an image formed by the lens unit 101 including the focusing lens is converted by the image sensor 102 into an electric signal. Then image data of the converted image is stored on a frame memory as a digital image.

The image recording medium 109 may include a nonvolatile memory, such as a flash memory, a ferroelectric random access memory (FeRAM), and an electrically erasable programmable ROM (EEPROM), and a magnetic disc, such as a hard disk. A recording medium that can be removably mounted on the imaging apparatus 100 may be used as the image recording medium 109. When final shooting is executed, the image having been captured by the imaging unit 112 and stored on the nonvolatile memory 113 is recorded on the image recording medium 109.

The face detection unit 104 is capable of detecting a plurality of person's faces from an input image. In addition, the face detection unit 104 outputs information about the number, locations, and sizes of the detected faces of persons (a face detection result). The face detection unit 104 may be configured to detect a person's face by template matching which uses a reference template corresponding to a contour of a person's face. In addition, it is also useful if the face detection unit 104 detects a person's face by template matching according to components (eyes, a nose, or ears) of the person's face. Further, the face detection unit 104 may detect vertexes of a head of a person by chroma key processing and detect a person's face according to the detected vertexes. Furthermore, the face detection unit 104 may detect an area in a captured image whose color is near color of the skin and detect the area as an area corresponding to a person's face. Moreover, it is also useful if the face detection unit 104 uses a neural network. In this case, the face detection unit 104 learns a person's face according to a teaching signal and determines an area highly likely to include an image of a person's face as an image of a person's face. In addition, the face detection processing executed by the face detection unit 104 may be implemented by any appropriate existing method.

The control unit 106 acquires face detection results of at least two images as input information. Further, the control unit 106 determines whether an object captured in the image is in a still state according to the face detection results. The processing for determining whether a person taken in a captured image is in a still state will be described in detail below.

The operation switches 107 include a shutter release button and an operation button. The user can issue an instruction, such as an instruction to change the shooting mode and an instruction to execute shooting, to the imaging apparatus 100 by operating the operation switches 107. The operation input by the user by operating the operation switches 107 is notified to the control unit 106.

The control unit 106 controls each of the components of the imaging apparatus 100 described above. More specifically, when the user presses the shutter release button during the normal shooting mode, the control unit 106 immediately notifies the imaging unit 112 of an image shooting command, and notifies the image recording medium 109 of an image recording command at the same time. On the other hand, when the user presses the shutter release button during the timer shooting mode, the control unit 106 notifies the imaging unit 112 of an image shooting command at a predetermined timing and notifies the image recording medium 109 of an image recording command at the same time. More specifically, the control unit 106 determines the timing of executing final shooting and executes control to perform the final shooting at the determined timing. In the present exemplary embodiment, a timer control unit is implemented by the control unit 106.

Figure 2:
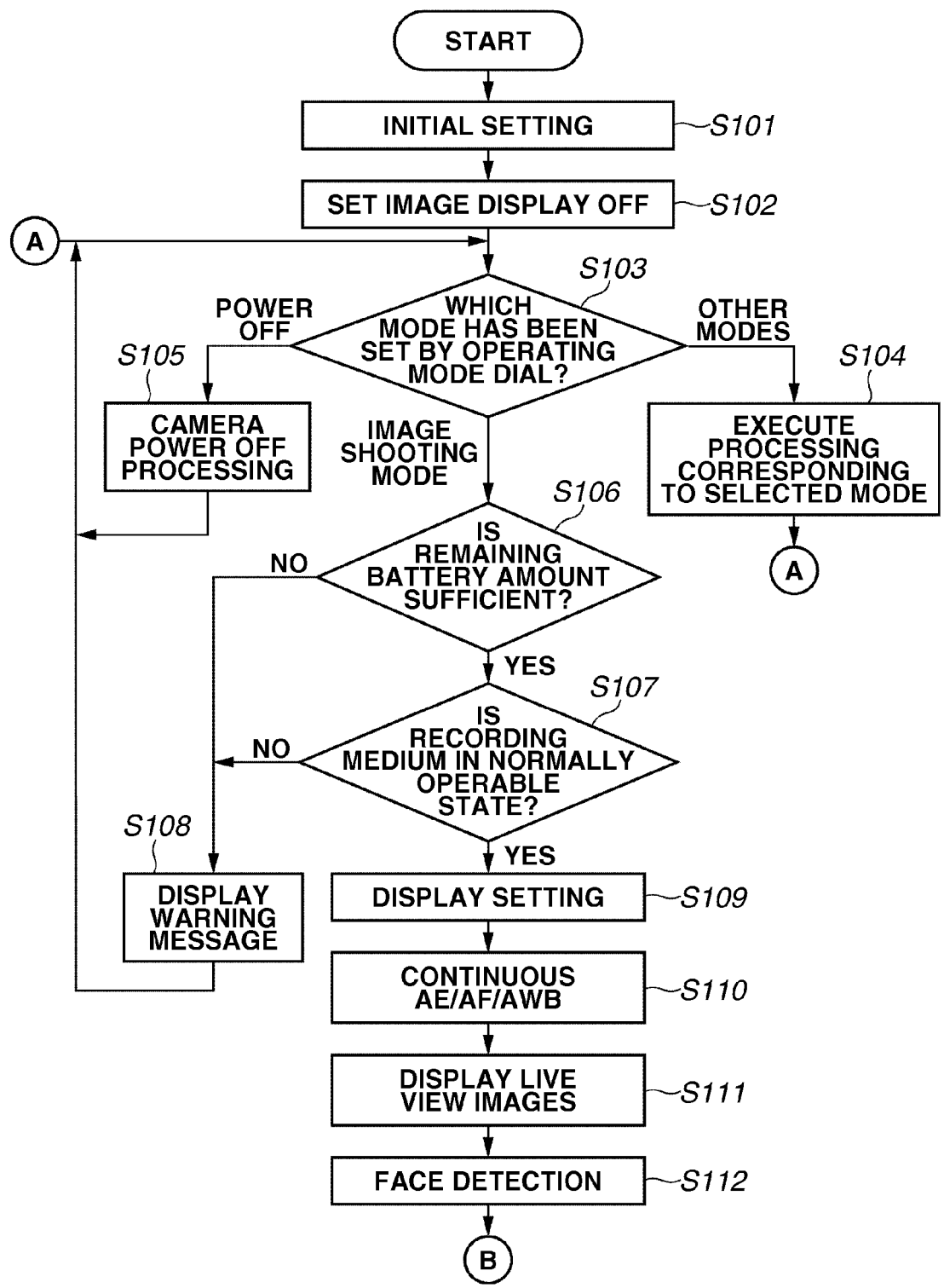
FIG. 2 is a flow chart illustrating an example of processing for starting up the imaging apparatus.
Figure 3:
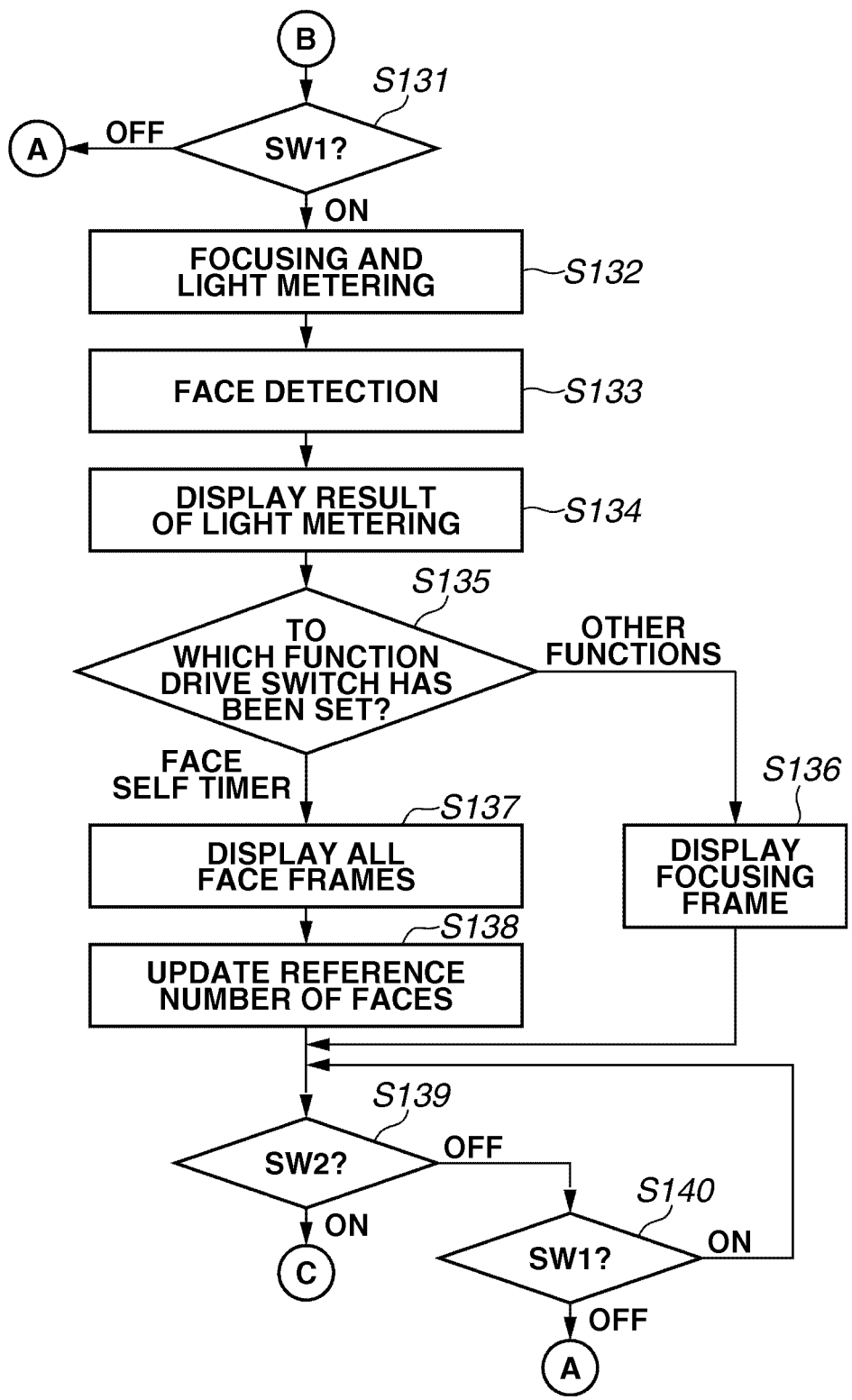
FIG. 3 is a flow chart illustrating an example of processing in relation to switches SW1 and SW2 which is executed by the imaging apparatus.

FIGS. 2 and 3 are flow charts illustrating an example of a main routine executed by the imaging apparatus 100 according to the present exemplary embodiment. The processing illustrated in FIGS. 2 and 3 is executed under control of the control unit 106.

Referring to FIG. 2, when the imaging apparatus 100 is powered on after a battery is exchanged, in step S101, the control unit 106 initializes flags and control variables. In step S102, the control unit 106 initializes a display of an image by the display device 111 to be off.

In step S103, the control unit 106 determines a position of the mode dial of the operation switches 107 set by the user. More specifically, in the present exemplary embodiment, the control unit 106 determines to which of "power off", "image shooting mode", and "other modes" the mode dial has been set.

If it is determined in step S103 that the mode dial has been set to "power off", then the processing advances to step S105. In step S105, the control unit 106 powers off the imaging apparatus 100. In executing the imaging apparatus power off processing, the control unit 106 executes control to discontinue the display on each display field. In addition, the control unit 106 executes control to protect the imaging unit 112 by closing a barrier (an imaging unit protection unit (not illustrated)). Further, the control unit 106 executes control to record necessary parameters including flags and control variables, setting values, and the set mode on the nonvolatile memory. Moreover, the control unit 106 executes predetermined imaging apparatus power off processing by discontinuing the unnecessary supply of power to each component of the imaging apparatus 100 including the display device 111. Then the processing returns to step S103.

On the other hand, if it is determined in step S103 that the mode dial has been set to "other modes", then the processing advances to step S104. In step S104, the control unit 106 executes processing according to the selected mode. Then the processing returns to step S103.

On the other hand, if it is determined in step S103 that the mode dial has been set to "image shooting mode", then the processing advances to step S106. In step S106, the control unit 106 determines whether a sufficient amount of battery remains and whether the imaging apparatus 100 is in a normally operable state. If it is determined that the remaining battery amount is not sufficient (NO in step S106), then the processing advances to step S108. In step S108, the control unit 106 executes control to display a predetermined warning message on the display device 111. Then the processing returns to step S103. On the other hand, if it is determined that a sufficient amount of battery remains (YES in step S106), then the processing advances to step S107.

In step S107, the control unit 106 determines whether the image recording medium 109 is in a normally operable state. More specifically, in step S107, the control unit 106 determines whether recording and reproduction of image data on and from the image recording medium 109 can be normally executed by the imaging apparatus 100. If it is determined that the image recording medium 109 is not in the normally operable state (NO in step S107), then the processing advances to step S108. In step S108, the control unit 106 executes control to display the predetermined warning message on the display device 111. Then the processing returns to step S103. On the other hand, if it is determined that the image recording medium 109 is in the normally operable state (YES in step S107), then the processing advances to step S109.

In step S109, the control unit 106 executes control to display various settings set to the imaging apparatus 100 by using the display device 111 by displaying an image or by issuing a sound. In step S110, the control unit 106 starts continuous auto exposure (AE)/auto focus (AF)/auto white balance (AWB) control to appropriately display images for live view following to variation of the object.

In step S111, the control unit 106 controls the display device 111 to start display of the live view images generated by the imaging unit 112. In step S112, the control unit 106 controls the face detection unit 104 to detect a person's face from image data used in displaying the live view images. Then the processing advances to step S131.

In the present exemplary embodiment, the "live view" is a function for serially displaying data serially written and stored on the nonvolatile memory 113 via the image sensor 102 and the camera signal processing unit 103 and allowing the user to observe an image of the object real time while looking at the display on the display device 111. Further, the display device 111 can display a frame for a part of or all of the faces detected by the face detection unit 104 at positions corresponding thereto in overlap with the live view images. Thus, the display device 111 can notify the user of a status of face detection.

In step S131, the control unit 106 determines whether a switch (a shutter switch) SW1 is pressed by the user. If it is determined that the switch SW1 is not pressed by the user (NO in step S131), then the processing returns to step S103. On the other hand, if it is determined that the SW1 is pressed by the user (YES in step S131), then the processing advances to step S132. In step S132, the control unit 106 controls a focusing unit (not illustrated) to execute focusing processing to set the focus of the lens unit 101 on the object. In addition, the control unit 106 executes light metering based on an output of the image sensor 102 and determines a diaphragm value and a shutter time according to a result of the light metering. In the light metering, the control unit 106 executes setting for a flash unit (not illustrated) when necessary.

After completing focusing and light metering in step S132, the processing advances to step S133. In step S133, the control unit 106 controls the face detection unit 104 to execute face detection. In step S134, the control unit 106 displays the result of the light metering on the display device 111.

Then in step S135, the control unit 106 determines to which function, i.e., "face self timer" or "other functions", a drive switch has been set. If it is determined that the drive switch has been set to "other functions", then the processing advances to step S136. In step S136, the control unit 106 displays a focusing frame which indicates an in-focus area of a result of the focusing on the display device 111. Then the processing advances to step S139.

On the other hand, if it is determined that the drive switch has been set to "face self timer", then the processing advances to step S137. In step S137, the control unit 106 displays all face frames on the display device 111. Then the processing advances to step S138. In step S138, the control unit 106 updates a reference number of faces. In the present exemplary embodiment, it is supposed that the control unit 106 executes processing for determining the reference number of faces. More specifically, the control unit 106 set the number of faces detected by the face detection unit 104 as the reference number of faces and stores the set reference number of faces on the nonvolatile memory 113. In step S138, the control unit 106 updates the reference number of faces stored on the nonvolatile memory 113 according to the result of the face detection in step S133.

In step S139, the control unit 106 determines whether a switch SW2 has been pressed by the user. If it is determined that the switch SW2 has not been pressed (OFF in step S139), then the processing advances to step S140. In step S140, the control unit 106 determines whether the switch SW1 has been pressed by the user. If it is determined that the switch SW1 has been pressed by the user (ON in step S140), then the processing returns to step S139. Therefore, the control unit 106 repeats the processing in steps S139 and S140 until it is determined that the switch SW2 is pressed in step S139 or that the switch SW1 is released in step S140.

Figure 4:
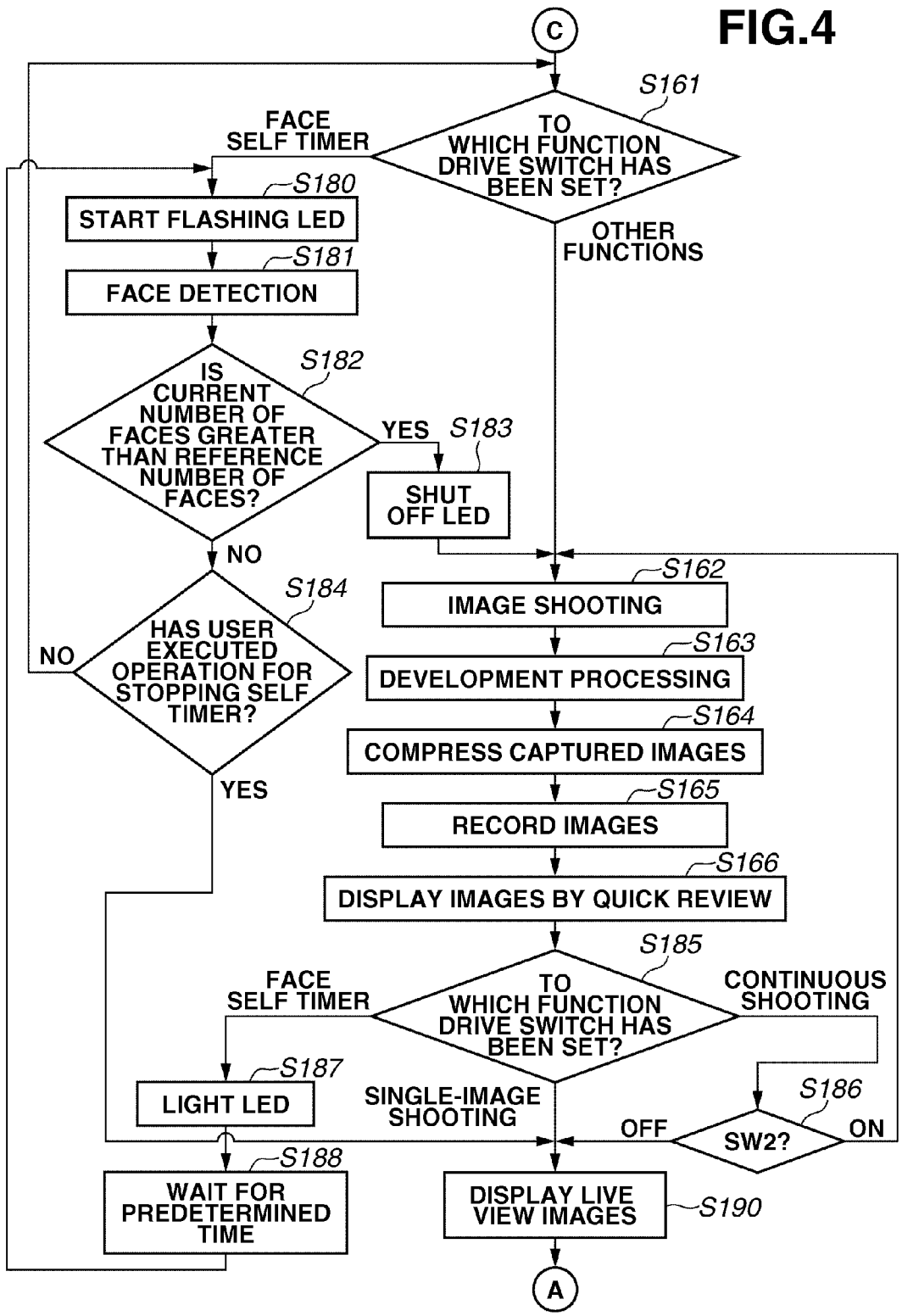
FIG. 4 is a flow chart illustrating an example of image shooting sequence according to a first exemplary embodiment of the present invention.

In the present exemplary embodiment, if the drive switch has been set to "face self timer", the control unit 106 displays a frame for all the detected faces on the display device 111 (S137) and updates the reference number of faces with the number equivalent to the number of the frames displayed on the display device 111 (S138). The control unit 106 maintains the displayed state until the switch SW2 is pressed by the user or the switch SW1 is released. If it is determined that the switch SW2 is pressed (ON in step S139), then the processing advances to step S161 (FIG. 4).

A first exemplary embodiment of the present invention will now be described below. Referring to FIG. 4, in step S161, the control unit 106 determines to which function, i.e., "face self timer" or "other functions", the drive switch has been set. If it is determined that the drive switch has been set to "other functions", then the processing advances to step S162. In step S162, the control unit 106 executes image shooting processing. The image shooting processing executed in step S162 includes processing for writing the image data of the captured image on the image recording medium 109 and development processing, which includes various processing executed on image data loaded from the image recording medium 109 by using the recording and reproduction control circuit 108.

In step S163, the control unit 106 reads the image data of the captured image which has been written on a predetermined area of the image recording medium 109 and executes various development processing, such as AWB processing, gamma conversion, and color conversion. In step S164, the control unit 106 reads the image data from the predetermined area of the image recording medium 109 and executes image compression on the read image data according to the set mode. In step S165, the control unit 106 writes the captured image data that has been subjected to the series of processing described above on a free space of an image storage buffer area of the image recording medium 109.

In step S166, the control unit 106 reads the image data that has been processed according to the content of display on the display device 111 from the image recording medium 109. Further, the control unit 106 transfers the image data to be displayed on an image display memory (not illustrated). In addition, the control unit 106 executes control for displaying the image data on the display device 111 by quick review.

In step S185, the control unit 106 determines to which function the drive switch has been set. If it is determined in step S185 that the drive switch has been set to "continuous shooting", then the processing advances to step S186. In step S186, the control unit 106 determines whether the switch SW2 has been pressed by the user. If it is determined that the switch SW2 has been continuously pressed by the user (ON in step S186), then the processing returns to step S162. In this case, the control unit 106 continuously executes image shooting operations.

On the other hand, if it is determined in step S185 that the drive switch has been set to "single-image shooting", then the processing advances to step S190. In step S190, the control unit 106 sets the display on the display device 111 to live view display. Then, after completing a series of image shooting operations, the processing returns to step S103. In this case, after the captured image displayed by quick review is verified by the user, the display mode can be changed to the live view display mode in which the image data captured for a next image shooting operation is serially displayed.

On the other hand, if it is determined in step S161 that the drive switch has been set to "face self timer", then the processing advances to step S180. In step S180, the control unit 106 flashes the LED 114, which is provided on a front side of the body of the imaging apparatus 100, to notify the user that processing for detecting an increase of the number of faces included in the image is currently executed. In step S181, the control unit 106 controls the face detection unit 104 to continue the face detection operation. In step S182, the control unit 106 determines whether the detected number of faces has become greater than the reference number of faces. If it is determined that the detected number of faces has become greater than the reference number of faces (YES in step S182), then the processing advances to step S183. In step S183, the control unit 106 shuts off the LED 114. Then in step S162, the control unit 106 advances the processing to the image shooting operations. After executing the series of image shooting operations in steps S162 through S166, the processing advances to step S187. In step S187, the control unit 106 lights the LED 114 for a predetermined time. In step S188, the control unit 106 waits until the predetermined LED-lit time elapses. Then the processing advances to step S180 to continue the face self timer operations again.

On the other hand, if it is determined that the current number of faces has not become greater than the reference number of faces (NO in step S182), then the processing advances to step S184. In step S184, the control unit 106 determines whether the user has executed an operation for stopping the self timer. If it is determined that the user has not executed an operation for stopping the self timer (NO in step S184), then the processing returns to step S161. On the other hand, if it is determined that the user has executed an operation for stopping the self timer (YES in step S184), then the processing advances to step S190.

As described above, according to the present exemplary embodiment, the imaging apparatus 100 lights the LED 114 after completion of image shooting operations and notifies the user who is included in the objects of the predetermined time. With this configuration, the imaging apparatus 100 according to the present exemplary embodiment can notify the user that the face detection is to be resumed. Accordingly, the user can control the timing of shooting a next image by intentionally turning his/her head away from the imaging apparatus 100 during the time period notified to the user and by looking back at the imaging apparatus 100 at an arbitrary timing.

During the time period in which the LED 114 is continuously lit for the predetermined time after the image shooting operation is completed (i.e., during the time period corresponding to the processing in steps S187 and S188), the face detection unit 104 does not execute face detection. In other words, the control unit 106 does not start image shooting if it is determined that the current number of faces has become greater or smaller than the reference number of faces.

Accordingly, the user who is also the object is allowed to freely recompose an image to be captured. The notification to the user which is executed by using the LED 114 is significant because the notification is executed to notify the user that it causes no problem for the user to turn his/her head away from the imaging apparatus 100 after the image is shot.

In the present exemplary embodiment, the face detection unit 104 does not execute face detection during the time period in which the LED 114 is continuously lit for the predetermined time after the image shooting is completed as described above. However, the present exemplary embodiment is not limited to this example. More specifically, it is also useful, during the predetermined time, if the face detection unit 104 executes face detection but the control unit 106 does not execute the determination as to whether the current number of faces has become greater than the reference number of faces.

Figure 5:
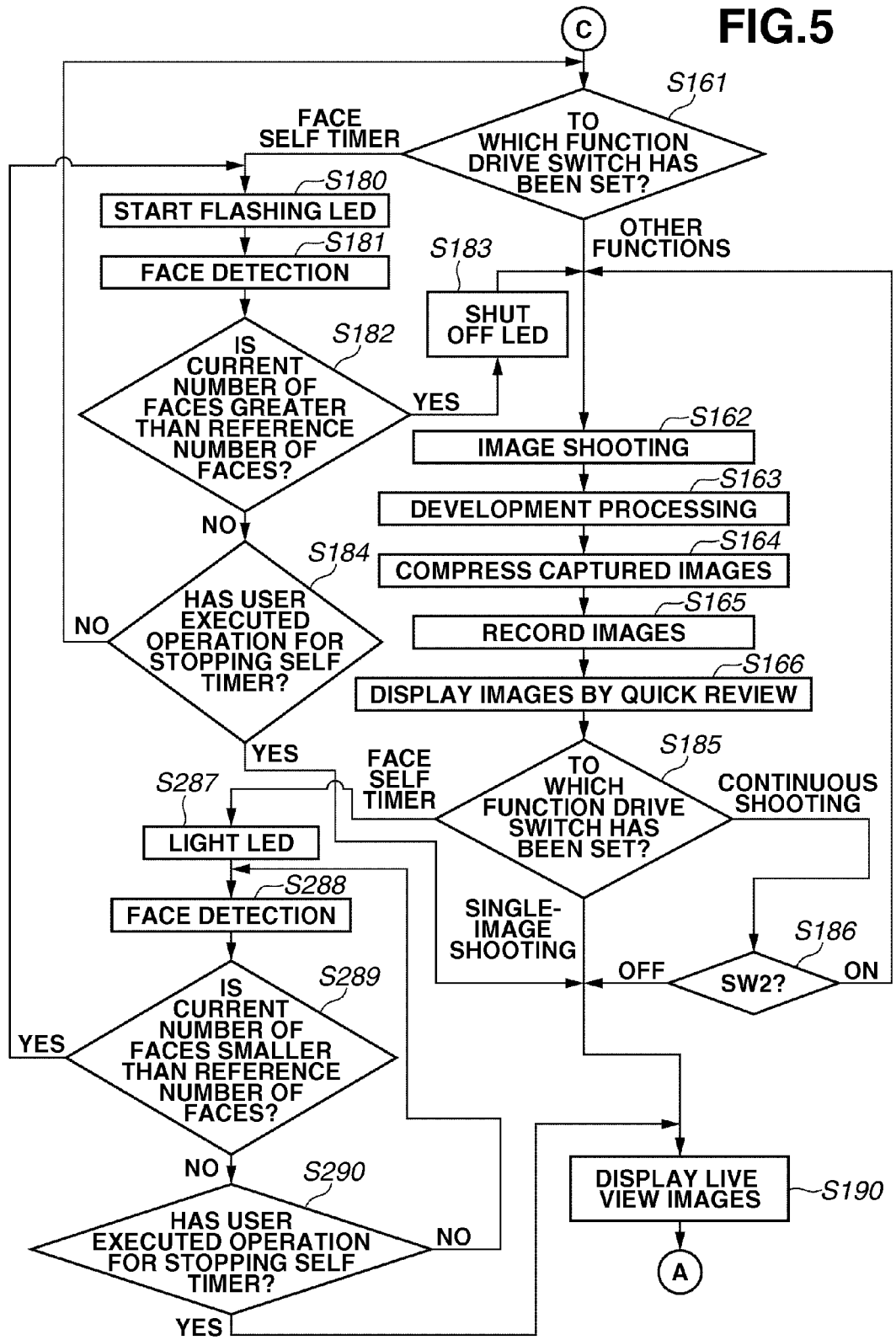
FIG. 5 is a flow chart illustrating an example of image shooting sequence according to a second exemplary embodiment of the present invention.

Now, a second exemplary embodiment of the present invention will be described in detail below with reference to FIG. 5. Referring to FIG. 5, in step S161, the control unit 106 determines to which function, i.e., "face self timer" or "other functions", the drive switch has been set. Processing to be executed according to the present exemplary embodiment if it is determined that the drive switch has been set to "other functions" is similar to that described above in the first exemplary embodiment. Accordingly, the processing executed in this case is provided with the same step numbers (steps S162 through S186) and the detailed description thereof will not be repeated here.

On the other hand, if it is determined in step S161 that the drive switch has been set to "face self timer", then the processing advances to step S180. In step S180, the control unit 106 flashes the LED 114, which is provided on the front side of the body of the imaging apparatus 100 to notify the user that processing for detecting an increase of the number of faces included in the image is currently executed. In step S181, the control unit 106 controls the face detection unit 104 to continue the face detection operation. In step S182, the control unit 106 determines whether the detected number of faces has become greater than the reference number of faces. If it is determined that the detected number of faces has become greater than the reference number of faces (YES in step S182), then the processing advances to step S183. In step S183, the control unit 106 shuts off the LED 114. Then the processing advances to step S162 and proceeds to the image shooting operations executed in step S162 and beyond.

On the other hand, if it is determined that the current number of faces has not become greater than the reference number of faces (NO in step S182), then the processing advances to step S184. In step S184, the control unit 106 determines whether the user has executed an operation for stopping the self timer. If it is determined that the user has not executed an operation for stopping the self timer (NO in step S184), then the processing returns to step S161. On the other hand, if it is determined that the user has executed an operation for stopping the self timer (YES in step S184), then the processing advances to step S190.

After executing the series of image shooting operations in steps S162 through S166, the processing advances to step S185. In step S185, the control unit 106 determines to which function the drive switch has been set. If it is determined in step S185 that the drive switch has been set to "face self timer", then the processing advances to step S287. In step S287, the control unit 106 lights the LED 114. In step S288, the control unit 106 controls the face detection unit 104 to execute face detection.

In step S289, the control unit 106 determines whether the number of faces detected in step S288 is smaller than the number of faces detected in step S182. If it is determined that the number of faces detected in step S288 is not smaller than the number of faces detected in the previous image shooting (NO in step S289), then the processing advances to step S290.

In step S290, the control unit 106 determines whether the user has executed an operation for stopping the self timer. If it is determined that the user has not executed an operation for stopping the self timer (NO in step S290), then the processing returns to step S288. On the other hand, if it is determined that the user has not executed an operation for stopping the self timer (YES in step S290), then the processing advances to step S190 to be continuously executed.

On the other hand, if it is determined that the number of faces detected in step S288 is smaller than the number of faces detected in the previous image shooting because the user has turned his/her head away from the imaging apparatus 100 (YES in step S289), then the processing advances to step S180.

In the above-described first exemplary embodiment, the user is to turn his/her head away from the imaging apparatus 100 within the predetermined time. On the other hand, according to the present exemplary embodiment, the user can securely control the timing of starting the operation of the face self timer because the subsequent shooting may not be started unless the number of detected faces becomes smaller than the number of faces captured in the previously image shooing which may occur when the user who is the object turns his/her head away from the imaging apparatus 100. The notification to the user who is also the object of the time period in which the number of detected faces has decreased, which is executed by using the LED 114, is significant because it can be notified the user that it causes no problem for the user to turn his/her head away from the imaging apparatus 100 after the image is shot.

FIG. 7 illustrates an example of an image shooting state according to the second exemplary embodiment of the present invention. In the example illustrated in FIG. 7, an exemplary display by LED in each state is illustrated. Referring to FIG. 7, an image S400 is displayed on the display device 111 when the user has pressed the switch SW1. At this timing, the control unit 106 sets a value "2" as the value of the reference number of faces. When the user presses the switch SW2, the control unit 106 shifts to a state S401 that face detection is currently executed.

Then, when a new person enters an angle of view as illustrated by an image S402, the control unit 106 determines that the number of detected faces has become greater than the reference number of faces. In a state S403, the control unit 106 starts image shooting. Then in a state S404, the imaging apparatus 100 shifts to a face decrease waiting state. As shown in a state S405, if any object looks away from the imaging apparatus 100 at an arbitrary timing to shift to a state in which face detection is not executed, then the processing proceeds to a face self timer operation for shooting a next image as in a state S406. In a state S407, when the object who has looked away turned his/her face to the imaging apparatus 100 again, the number of detected faces has become greater than the reference number of faces. Then, the control unit 106 executes the image shooting operations again in the state S403. By continuing the above-described operation for shooting a desired number of images, the user can control the number of images to be shot.

Figure 6:
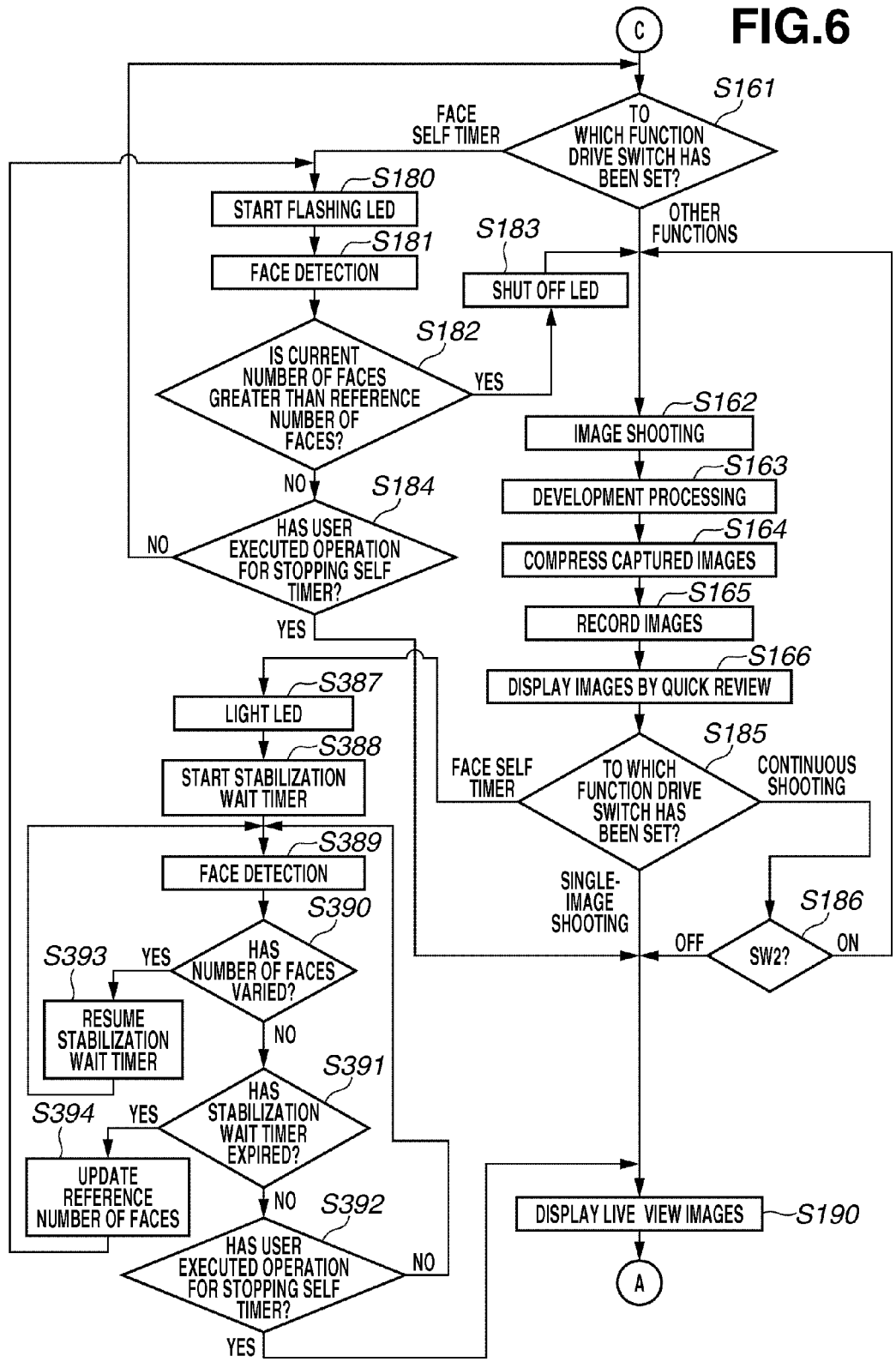
FIG. 6 is a flow chart illustrating an example of image shooting sequence according to a third exemplary embodiment of the present invention.

Now, a third exemplary embodiment of the present invention will be described in detail below with reference to FIG. 6. Referring to FIG. 6, in step S161, the control unit 106 determines to which function, i.e., "face self timer" or "other functions", the drive switch has been set. Processing to be executed according to the present exemplary embodiment if it is determined that the drive switch has been set to "other functions" is similar to that described above in the first exemplary embodiment. Accordingly, the processing executed in this case is provided with the same step numbers and the detailed description thereof will not be repeated here.

On the other hand, if it is determined in step S161 that the drive switch has been set to "face self timer", then the processing advances to step S180. In step S180, the control unit 106 flashes the LED 114, which is provided on the front side of the body of the imaging apparatus 100, to notify the user that processing for detecting an increase of the number of faces included in the image is currently executed. In step S181, the control unit 106 controls the face detection unit 104 to continue the face detection operation. In step S182, the control unit 106 determines whether the detected number of faces has become greater than the reference number of faces. If it is determined that the detected number of faces has become greater than the reference number of faces (YES in step S182), then the processing advances to step S183. In step S183, the control unit 106 shuts off the LED 114. Then the processing advances to step S162 and proceeds to the image shooting operations executed in step S162 and beyond.

After executing the series of image shooting operations in steps S162 through S166, the processing advances to step S185. In step S185, the control unit 106 determines to which function the drive switch has been set. If it is determined in step S185 that the drive switch has been set to "face self timer", then the processing advances to step S387. In step S387, the control unit 106 lights the LED 114. In steps S388 through S391 and step S393, the control unit 106 executes face stabilization detection. More specifically, the control unit 106 waits until the number of detected faces to be constant and stable, in other words, the same number of faces are detected for a predetermined time period and while the position of each detected face varies within a predetermined range only. In step S388, the control unit 106 starts a face stabilization wait timer. In step S389, the control unit 106 executes control for starting face detection. In step S390, the control unit 106 determines whether the number of faces has varied. If it is determined that the number of faces has varied (YES in step S390), then the processing advances to step S393. In step S393, the control unit 106 resumes the face stabilization wait timer.

On the other hand, if it is determined that the number of faces has not varied (NO in step S390), then the processing advances to step S391. In step S391, the control unit 106 determines whether the face stabilization wait timer has expired. If it is determined that the face stabilization wait timer has expired (YES in step S390), then the processing advances to step S394. In step S394, the control unit 106 updates the reference number of faces which is the number of faces that has become constant after the changing of the attitude of the object users has been completed or the exchange of the object users has been completed. Then in step S180, the control unit 106 continues the operation of the face self timer.

On the other hand, if it is determined that the face stabilization wait timer has not expired (NO in step S391), then the processing advances to step S392. In step S392, the control unit 106 determines whether the user has executed an operation for stopping the self timer. If it is determined that the user has not executed an operation for stopping the self timer (NO in step S392), then the processing returns to step S389 and repeats the above described processing in step S389 and beyond. On the other hand, if it is determined that the user has executed an operation for stopping the self timer (YES in step S392), then the processing advances to step S190. In step S190, the control unit 106 sets the display on the display device 111 to live view display. Then, after completing a series of image shooting operations, the processing returns to step S103.

With the above described configuration, the present exemplary embodiment can allow the user to freely delay the timing of starting the operation of the face self timer by intentionally changing the number of faces to be detected or by turning his/her head away from the imaging apparatus 100. The notification to the user who is the object of the time period for waiting the stabilization of the number of faces which is executed by using the LED 114 is significant because the user can be notified that it causes no problem for the user to turn his/her head away from the imaging apparatus 100 after the image is shot.

If the face detection unit 104 is capable of detecting a user's profile turning sideways, the user can easily execute control of continuous shooting using the face self timer by using only the user's face looking at the imaging apparatus 100 for the operation of the face self timer. In other words, if the profile of a user is used as a user face detection target for the operation of the face self timer and if the user hides his/her face by turning around or by covering with his/her hands to decrease the number of faces to be detected, it becomes difficult for the user to control continuous image shooting by the face self timer. In the present exemplary embodiment, the state of operation of the face self timer is notified to the user by using the LED 114. However, the present exemplary embodiment is not limited to this configuration. The above described notification to the user may be executed by issuing a sound or by another appropriate method.

In the present exemplary embodiment, the operation for stopping the self timer, which is described above with reference to FIGS. 4 through 7, refers to an operation for stopping the operation of the self timer by operating the drive switch, the switch SW1, or the switch SW2. In the present exemplary embodiment, the control unit 106 starts image shooting when a trigger for shooting an image is detected. However, it is also useful if the control unit 106 executes light metering and focusing again before starting an actual operation for shooting an image.

The present invention can also be achieved by providing a system or an apparatus with a nonvolatile storage medium storing program code of software (a computer program) implementing the functions of the above described exemplary embodiments and by reading and executing the program code stored on the storage medium with a computer of the system or the apparatus (a central processing unit (CPU) or a micro processing unit (MPU)).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2009-219195 filed Sep. 24, 2009 and No. 2010-191295 filed Aug. 27, 2010, which are hereby incorporated by reference herein in their entirety.

What is claimed is:

1. An apparatus comprising:
   an imaging unit configured to capture an image;
   an operation member configured to receive an operation;
   a detection unit configured to detect faces of a plurality of persons from image data of the captured image; and
   a control unit configured to control the imaging unit to start a shooting operation if a number of detected faces increases after the operation member is operated,
   wherein the control unit determines whether the number of detected faces become smaller after the shooting operation is completed, and if the number of detected faces are determined to become smaller, the control unit makes the imaging unit restart the shooting operation when the number of detected faces increases, and if the number of detected faces are not determined to become smaller, the control unit does not allow the imaging unit to restart the shooting operation even when the number of detected faces increases.

2. The apparatus according to claim 1, further comprising a notification unit configured to notify the user that the number of detected faces has become smaller than the number of faces detected at the time of starting the shooting operation.

3. An apparatus comprising:
   an imaging unit configured to capture an image;
   an operation member configured to receive an operation;
   a detection unit configured to detect faces of a plurality of persons from image data of the captured image; and
   a control unit configured to control the imaging unit to start a shooting operation if a number of detected faces increases after the operation member is operated,
   wherein the control unit determines whether the condition, where the number of detected faces do not change, has been constant for a predetermined time after the shooting operation has been completed, and if the condition, where the number of detected faces do not vary, is determined to be constant for a predetermined time, the control unit makes the imaging unit re-start the shooting operation when the number of detected faces increases, and if the condition, where the number of detected faces do not vary, is not determined to be constant for a predetermined time, the control unit does not allow the imaging unit to re-start the shooting operation even if the number of detected faces increases.

4. The apparatus according to claim 3, further comprising a notification unit configured to notify the user, that the number of detected faces has not varied for the predetermined time period after the shooting operation is completed.

5. A method comprising:
  detecting faces of a plurality of persons from image data captured by an imaging unit;
  starting a shooting operation of the imaging unit when a number of detected faces increases after an operation member is operated; and
  determining whether the number of detected faces has become smaller after the shooting operation is completed, and if the number of detected faces are determined to become smaller, a control unit makes the imaging unit restart the shooting operation when the number of detected faces increases, and if the number of detected faces are not determined to become smaller, the control unit does not allow the imaging unit to restart the shooting operation even when the number of detected faces increases.

6. The method according to claim 5, further comprising notifying the user that the number of detected faces has become smaller than the number of faces detected at the time of starting the shooting operation.

7. A method comprising:
  detecting faces of a plurality of persons from image data captured by an imaging unit;
  starting a shooting operation of the imaging unit when a number of detected faces increases after an operation member is operated; and
  determining whether the condition, where the number of detected faces do not change, has been constant for a predetermined time after the shooting operation has been completed, and if the condition, where the number of detected faces do not vary, is determined to be constant for a predetermined time, a control unit makes the imaging unit re-start the shooting operation when the number of detected faces increases, and if the condition, where the number of detected faces do not vary, is not determined to be constant for a predetermined time, the control unit does not allow the imaging unit to re-start the shooting operation even if the number of detected faces increases.

8. The method according to claim 7, further comprising notifying the user, that the number of detected faces has not varied for the predetermined time period after the shooting operation is completed.

9. A non-transitory computer-readable storage medium storing a computer program which, when executed by a computer, causes the computer to perform operations for controlling an apparatus, the computer program comprising:
  detecting faces of a plurality of persons from captured image data;
  starting a shooting operation when a number of detected faces increases after an operation member is operated; and
  determining whether the number of detected faces become smaller after the shooting operation is completed, and if the number of detected faces are determined to become smaller, a control unit makes an imaging unit restart the shooting operation when the number of detected faces increases, and if the number of detected faces are not determined to become smaller, the control unit does not allow the imaging unit to restart the shooting operation even when the number of detected faces increases.

10. The non-transitory computer-readable storage medium according to claim 9, further comprising notifying the user that the number of detected faces has become smaller than the number of faces detected at the time of starting the shooting operation.

11. A non-transitory computer-readable storage medium storing a computer program which, when executed by a computer, causes the computer to perform operations for controlling an apparatus, the computer program comprising:
  detecting faces of a plurality of persons from captured image data;
  starting a shooting operation when a number of detected faces increases after an operation member is operated; and
  determining whether the condition, where the number of detected faces do not change, has been constant for a predetermined time after the shooting operation has been completed, and if the condition, where the number of detected faces do not vary, is determined to be constant for a predetermined time, a control unit makes an imaging unit re-start the shooting operation when the number of detected faces increases, and if the condition, where the number of detected faces do not vary, is not determined to be constant for a predetermined time, the control unit does not allow the imaging unit to re-start the shooting operation even if the number of detected faces increases.

12. The non-transitory computer-readable storage medium according to claim 11, further comprising notifying the user, that the number of detected faces has not varied for the predetermined time period after the shooting operation is completed.

* * * * *